Dec. 26, 1939.   E. C. S. CLENCH   2,184,793
CONTROLLING VALVE FOR LIQUID PRESSURE CONTROL SYSTEMS
Filed Aug. 18, 1937   3 Sheets-Sheet 3

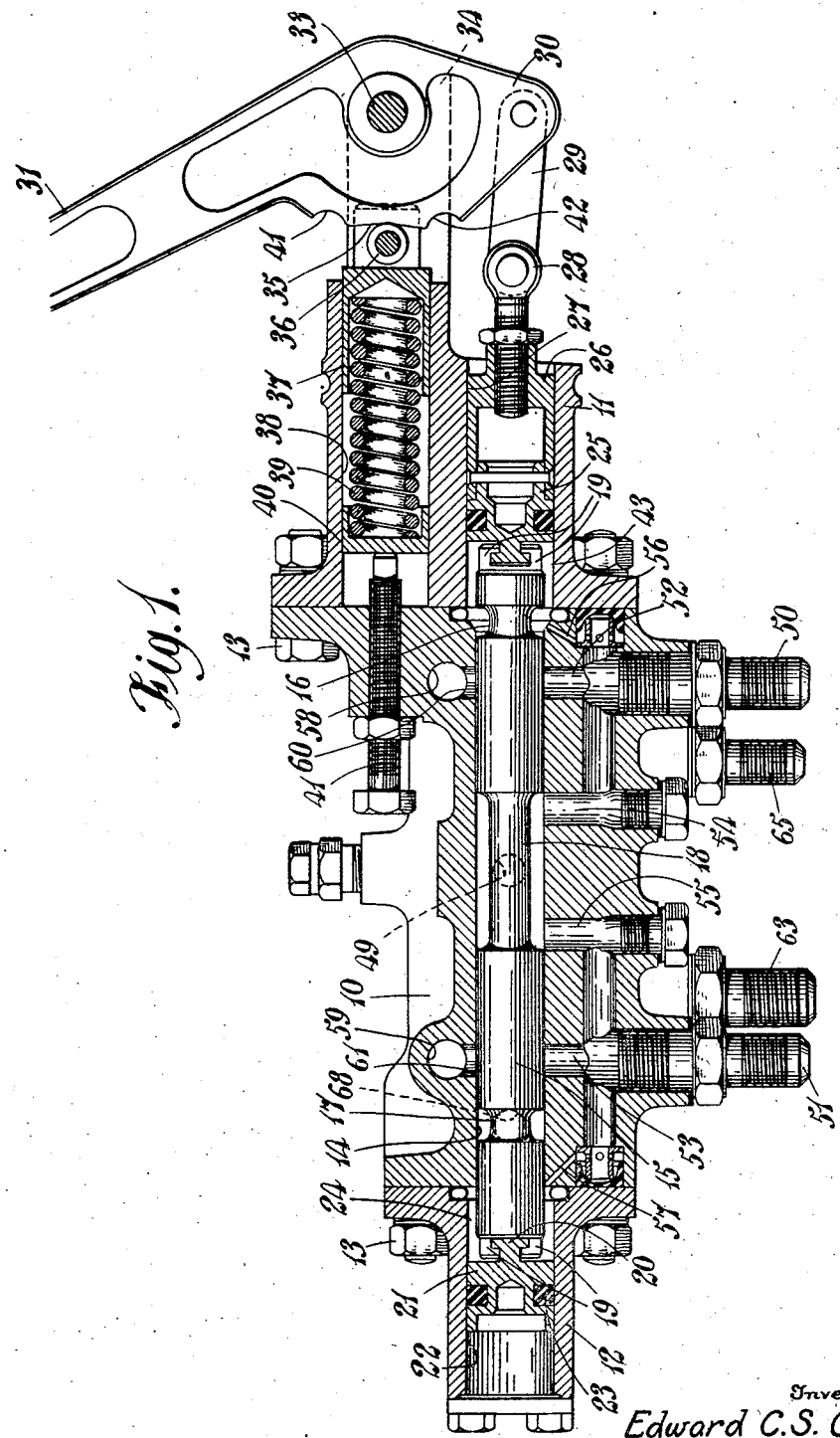
Dec. 26, 1939.    E. C. S. CLENCH    2,184,793
CONTROLLING VALVE FOR LIQUID PRESSURE CONTROL SYSTEMS
Filed Aug. 18, 1937    3 Sheets-Sheet 1
Inventor.
Edward C.S. Clench
By Martin J. Finnegan
Attorney.

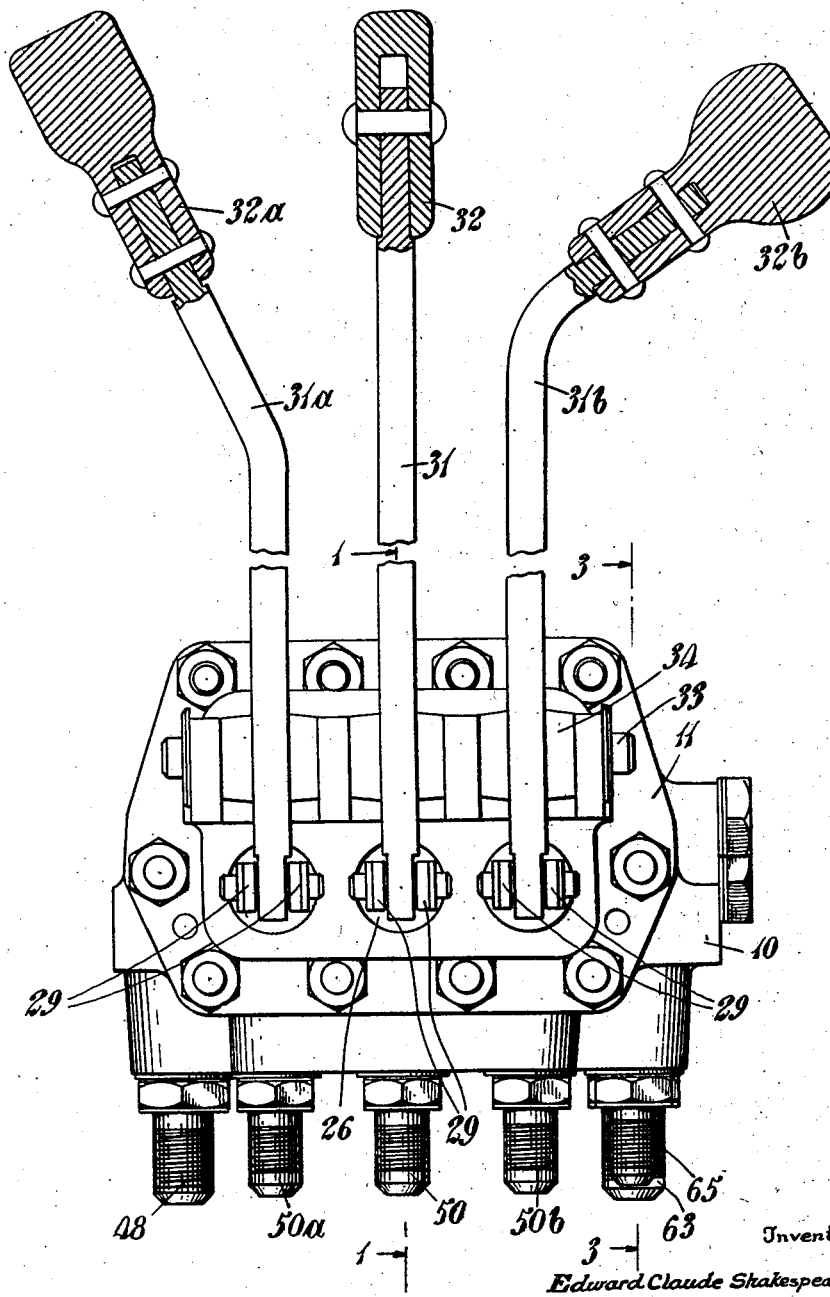

Inventor.
Edward Claude Shakespeare Clench
By J. R. Cox
Attorney

Patented Dec. 26, 1939

2,184,793

UNITED STATES PATENT OFFICE 2,184,793

CONTROLLING VALVE FOR LIQUID PRESSURE CONTROL SYSTEMS

Edward Claude Shakespeare Clench, Leamington Spa, England, assignor to Automotive Products Company Limited, London, England Application August 18, 1937, Serial No. 159,803
In Great Britain August 20, 1936

8 Claims. (Cl. 137—139).

This invention relates to controlling valves for liquid pressure remote control systems and is particularly adapted for but not limited to the operation of landing gear, wing flaps, bomb release devices and the like.

One object of the present invention is to provide an improved controlling valve which is particularly useful in practice and a liquid pressure remote control system embodying such a valve.

Another object of the invention is to provide a fluid pressure control system comprising a valve, wherein a manual actuating member for the valve may be releasably locked in "on" or open position, and wherein means is provided for automatically bringing the actuating member to the "off" or closed position when the pressure of the fluid admitted through the valve overcomes the resistance of the locking means.

The improved valve which is used for controlling the delivery of liquid from a transmitter pump to a motor unit is arranged so that it is automatically reverted to its "off" condition when the pressure of liquid fed to the motor unit exceeds a predetermined value.

The improved arrangement is particularly useful in connection with motor cylinder units, whereof the pistons or equivalent have two main working positions, namely one at each end of their normal range of movement.

When the control valve is placed in its "on" position, thus placing the motor unit in communication with a continuously operating transmitter pump, the delivery of pressure liquid from the transmitter pump to the motor unit proceeds to change the setting of the latter, and when the usual piston or equivalent of said motor unit reaches the end of its permissible movement and is arrested the subsequent rise in the pressure of the liquid acts upon a pressure-sensitive device in said controlling valve and causes the latter to be automatically moved to its "off" position.

Thus, the invention provides a control valve for a liquid pressure remote control system incorporating a valve plunger with manual actuating means, and with a device whereby an increase in the pressure of the liquid passing through said valve automatically actuates the valve plunger so as to interrupt the supply of pressure liquid to the motor unit.

The invention further provides a control valve for a liquid pressure remote control system comprising a plurality of valve plungers which are actuated by corresponding manual levers to control a series of pipe lines which feed pressure liquid from a transmitter pump to corresponding motor cylinder units, the invention being characterized by the fact that, at the end of the permissible stroke of the piston or equivalent of each motor unit the corresponding valve plunger is returned automatically by the liquid pressure to its "off" position, in which it connects with a liquid reservoir, the pipe line or lines leading to said motor unit, the output of the transmitter pump being also, if desired, placed into communication with the reservoir by the automatic action of the valve.

Further, the improved liquid pressure remote control system in its double-acting form may incorporate a control valve of the plunger type arranged to place either one of the pipe lines leading to opposite ends of the motor unit into communication, either with a reservoir or with a pressure-creating transmitter unit, means being incorporated which automatically render the transmitter unit ineffectual and which place both of the motor unit pipe lines into communication with the reservoir in the event of the pressure of the working liquid being fed to the motor unit rising above a predetermined value.

Other objects and features of the invention and other novel combinations of parts and desirable particular constructions will be apparent from the following description and from the accompanying drawings which show one particular construction of valve controlling three separate motor units or sets of motor units, and in which Figure 1 is a side sectional elevation taken on the line 1—1 of Figure 2;

Figure 2 is a front elevation;

Figure 3:
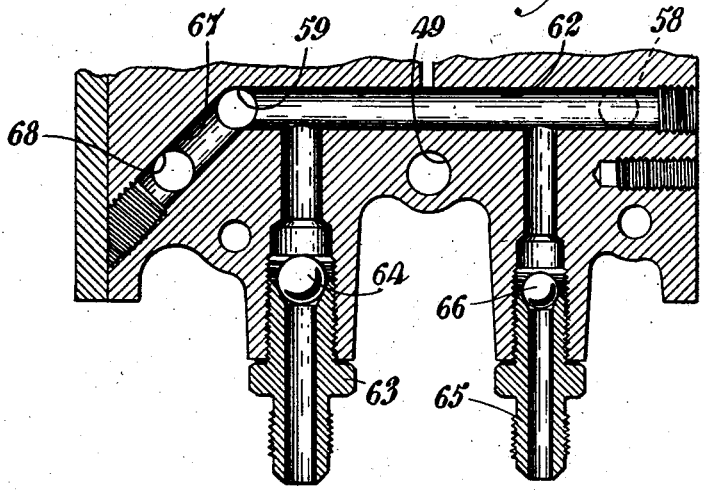
Figure 3 is a fragmentary sectional elevation taken on the line 3—3 of Figure 2.

The body of the control valve shown in Figures 1, 2 and 3 comprises three main parts, a central housing 10, a front portion 11 and a rear portion 12 secured together as by nuts and bolts 13. The housing 10 is formed with three longitudinal bores, only one of which is shown at 14 in Figure 1, said bores being arranged side by side in parallel formation and being all of identical construction. Each accommodates slidably a substantially cylindrical valve plunger 15 which is formed adjacent its front and rear ends with waist portions 16 and 17 respectively, while its central part is reduced in diameter for a substantial length as indicated at 18. These waisted portions are employed for controlling the flow of liquid by co-acting with ports in the housing 10, as will be hereinafter explained.

At its rear end each of the plungers 15 has a pair of claws 19 arranged to embrace the flanged projection 20 formed upon a piston member 21 which is slidable within a cylindrical bore 22 in the end portion 12, a packing ring 23 of rubber or any suitable material being provided to prevent leakage. It will be noted that the diameter of the bore 22 is appreciably larger than that of the bore 14 in the housing 10, and this results in the formation of an annular working space 24, the volume of which varies according to the position of the plunger 15. A similar construction is employed at the front end of each plunger 15, a pair of claws 19 being arranged to engage a front piston 25 in a slightly loose manner so as to enable the two parts to slide freely within their respective bores should there be any slight inaccuracy in machining.

The piston 25 has a cup-shaped extension 26 and these two parts slide within a cylindrical bore 27 formed in the front portion 11, said extension 26 being fitted with an eye 28 connected by a pair of pivotal links 29 with the lower end 30 of an operating lever 31. It will be noted from Figure 2 that three such levers are provided, the outside two being indicated at 31a and 31b respectively, said levers being fitted at their upper ends with corresponding knobs 32, 32a and 32b which are different in shape so as to be readily distinguishable by touch. The three levers are pivoted at 33 upon a forward extension 34 of the front portion 11, and each is shaped with a cam surface 35 which is engaged by a follower roller 36 fitted to a plunger 37 slidably mounted within a bore 38 in the front portion 11.

This bore 38 contains also a relatively strong coiled compression spring 39 having an end cap 40 against which an adjusting screw is arranged to bear for the purpose of regulating the normal compression force exerted by the spring 39. It will be seen that the cam surface 35 has its central portion slightly V-shaped thus enabling the spring 39 to centralise the lever 31 and consequently the plunger 15, as will appear more fully hereinafter. At each end, however, the cam surface 35 is formed with a notch 41 and 42 corresponding with the extreme right and extreme left positions respectively of the valve plunger 15. The cam surface 35 is thus undulating in form, and is designated to constitute a non-positive locking means for the lever 31.

Thus, when the lever 31 is moved forwardly, i. e. to the right in Figure 1, the follower roller 36 engages with the notch 42 at the end of this movement with sufficient force to enable this setting of the valve plunger 15 to be maintained. When, as will be explained in further detail due to the increase in pressure developed by a pump as 46 on arresting of the piston 47 for example of the motor unit, sufficient effort is applied to the lever 31, the roller 36 mounts up the side of the notch 42, and once again causes the lever 31 to be centralised. This is the action which takes place in accordance with the invention, the valve plunger 15 being automatically returned to its central or "off" position by the action of liquid pressure within the working space 43 or a corresponding space 24 ahead of the piston 21.

Figure 4:
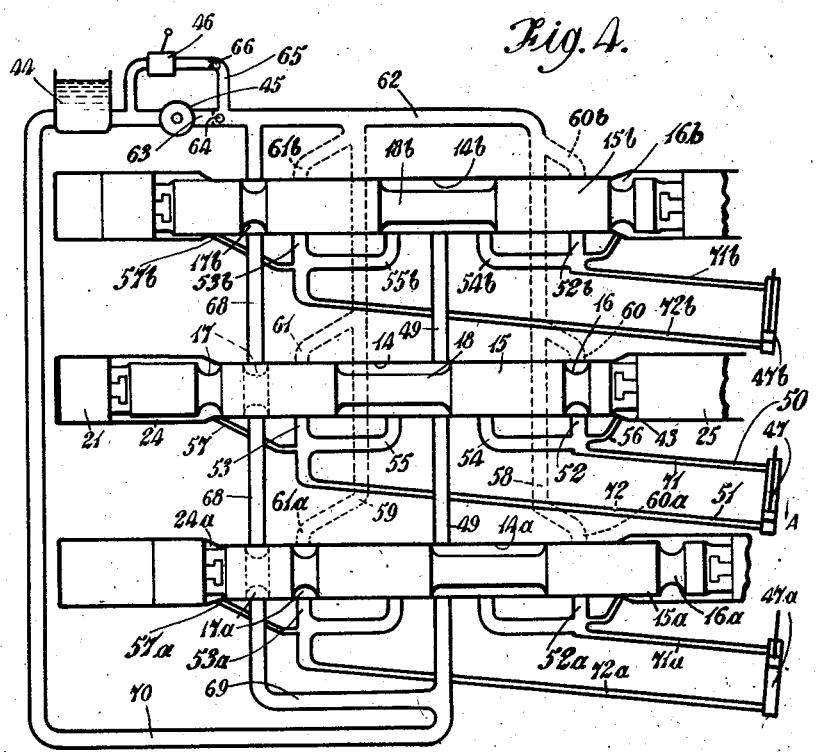
Figure 4 is a diagram showing the connections within the control valve, and indicating the associated parts of the complete remote control system.

In the present construction the passages connecting the various parts of the control valve with one another and with the external components of the remote control system are formed by drilling passages in the housing 10, and these can be readily followed by a comparison between Figures 1, 3 and the diagram Figure 4, which is intended to show diagrammatically the various ports and passages and provide a general layout which permits the operation of the system to be more completely followed. The external components of the system comprise a reservoir 44, a uni-directional mechanical pump 45 which is continuously driven by an engine or any other suitable means, a uni-directional hand pump 46 and three double-acting motor units or sets of motor units which are indicated diagrammatically at 47, 47a and 47b (Figure 4), the pistons or equivalent of said motor units being operatively connected to a device to be operated.

A union 48 (Figure 2) connects by way of a vertical passage (not shown) with a horizontal passage 49 which intersects the three bores which are indicated at 14, 14a and 14b in Figure 4, and, of course, correspond in form to the bore 14 in Figure 1; the motor unit 47 is connected with the valve by means of a pair of unions shown at 50 and 51 in Figure 1 and these communicate with ports 52 and 53 respectively terminating in the bore 14. In each case, an auxiliary passage 54 and 55 respectively enters the bore 14 adjacent the waist portion 18 of the plunger 15, while further passages 56 and 57 respectively communicate with the annular working spaces 43 and 24 respectively.

As the constructional details of the three plungers are identical, similar features are shown in the case of the plungers 15a and 15b by letters a and b respectively. It is to be noted that the plunger 15b is shown in the neutral position, the plunger 15 in the extreme left and the plunger 15a in the extreme right position.

A pair of transverse passages 58 and 59 communicate with ports 60 and 61 diametrically opposite to the ports 52 and 53 respectively, and these two passages 58 and 59 are connected together by a longitudinal bore 62 shown in Figure 3. This is fed with pressure liquid, either from the mechanical pump 45, through a union 63 having a non-return ball valve 64, or else from the hand pump 46 through a union 65 having a non-return valve 66. The passage 62 also communicates by way of an oblique passage 67 (Figure 3) with a transverse passage 68 (Figures 1, 3 and 4), which also intersects the three plunger bores 14, 14a and 14b. The passage 68 is positioned in line with the waist portions 17, 17a and 17b when the plungers are in their "off" positions, i. e. the position of valve plunger 15b Figure 4, and is connected by a longitudinal passage 69 (see Figure 4) with the union 48 and thence by a conduit 70 with the reservoir 44. The motor unit 47 is connected by conduits 71 and 72 with the unions 50 and 51 respectively, while the connections to the motor units 47a and 47b are correspondingly indicated in Figure 4.

The operation of the whole system is as follows. With all the plungers of the control valve disposed in their "off" positions, that is in the position in which the valve plunger 15b is shown in Figure 4, the waisted portions 17, 17a and 17b are all disposed in line with the passage 68 as shown by the dotted lines in respect of plungers 15 and 15a, thus connecting the delivery of the pump 45 (or the hand pump 46 if it is working) into direct communication with the reservoir through passages 68, 69 and conduit 70. At the same time both of the conduits 71—72, 71a—72a, 71b—72b from each motor unit are connected also with the reservoir by way of the passage 49 and conduit 70. As shown in Figure 4 both of the conduits 71b, 72b communicate through the branch passages 54b and 55b with the passage 49. As the plungers never move by an amount sufficient to interrupt the passage 49, those motor cylinder units which are not operative at any particular moment have both conduits automatically connected to the reservoir for breathing in order to compensate for leakage and for expansion and contraction on account of temperature changes.

When one of the plungers is moved to the left to its "on" position in which the plunger 15 is shown in Figure 4 the branch 54 is isolated from the reservoir, and at the same time the passage 68 is blocked owing to the new positions occupied by the waist portions 18 and 17 respectively. At the same time the pressure liquid in the passage 62 is allowed to pass into the conduit 71 by way of the annular space surrounding the waist portion 16, thus permitting the actuating of the motor unit 47 to take place in the direction of the arrow A, the liquid ejected into the conduit 72 being returned to the reservoir through the conduit 72, branch passage 55, bore 14, passage 49 and conduit 70. When the piston of the motor unit 47 reaches the end of its stroke and can move no further the pressure of the liquid in the conduit 71 and in the passage 58 automatically increases as the pump 45 continues to run, and as this pressure is communicated through the conduit 71 and passage 56 to the working space 43 the piston 25 is automatically moved to the right as soon as the effort derived from the pressure liquid is sufficiently strong to overcome the coiled compression spring 39 and allow the roller 36 to ride up out of the notch 42. Once this movement has been started the shape of the cam surface 35 causes the lever 31 and the plunger 15 to be centralised, even after the supply of pressure liquid to the space 43 has been cut off.

In order to actuate any one of the motor units in the opposite direction the appropriate plunger 15, 15a or 15b is moved to the right and occupies the position in which the plunger 15a is shown in Figure 4. This again causes the passage 68 to be blocked, and liquid under pressure is, therefore, fed to the conduits 72a through passage 59 and also into the working space 24a through passage 57a. When the pressure automatically rises after arresting at the top of its stroke of the piston of motor unit 47a (Figure 4) the valve plunger 15a is returned to its "off" position as heretofore explained with respect to valve plunger 15.

The control valve may, of course, be constructed in several different ways to work in accordance with the invention, and moreover such control valves can be used with numerous forms of remote control system including those of the single-acting variety. Moreover, other pressure-sensitive devices may be employed for automatically returning the control valve or a part thereof to its "off" position when the pressure rises to a predetermined extent beyond the normal working value.

It will of course be understood that the connections within the control valve may be arranged in other ways to obtain the same effect, and means other than the cam and follower mechanism may be employed to hold the plunger in its end positions and to assist in returning it to the central position when the operation is completed.

Whilst one embodiment of the invention has been illustrated and described it is to be particularly understood that that embodiment is to be considered as exemplary and not limitative and that the scope of the invention is to be determined by the claims appended hereto.

Having thus described the various features of the invention, what I claim as new and desire to sure by Letters Patent is:

1. A control valve for a fluid pressure control system comprising a cylindrical chamber, a valve plunger in the chamber controlling the flow of fluid through said valve, an actuating member operating said plunger, means for locking the actuating member in either of two "on" positions, and means for automatically bringing the actuating member into an "off" position intermediate said two "on" positions when the pressure of the fluid overcomes the resistance of said locking means.

2. A control valve for a fluid pressure control system comprising a cylindrical chamber, a valve plunger in the chamber controlling the flow of fluid through said valve, an actuating member operating said plunger, means for locking the actuating member in either of two "on" positions, and means for automatically bringing the actuating member into an "off" position intermediate said two "on" positions when the pressure of the fluid overcomes the resistance of said locking means, said locking means being further effective to lock the actuating member in said "off" position.

3. A control valve for a fluid pressure control system comprising a cylindrical chamber having ports therein, a valve plunger in the chamber controlling the flow of fluid through said ports, an actuating member operating the said plunger, means for locking the actuating member in either of two "on" positions, means for automatically bringing the actuating member into an "off" position intermediate said two "on" positions when the pressure of the fluid overcomes the resistance of said locking means, and means for maintaining communication between said chamber ports when said actuating member is in the "off" position.

4. A control valve for a fluid pressure control system comprising a cylindrical chamber having ports therein, a valve plunger in the chamber controlling the flow of fluid through said ports, an actuating member operating the said plunger, means for locking the actuating member in either of two "on" positions, means for automatically bringing the actuating member into an "off" position intermediate said two "on" positions when the pressure of the fluid overcomes the resistance of the locking means, said locking means being further effective to lock the actuating member in said "off" position, and means for maintaining communication between said chamber ports when said actuating member is in the "off" position.

5. A control valve for a fluid pressure control system comprising a chamber, a valve movable in the chamber to control the flow of fluid therethrough, an actuating member operating said valve, means for locking the actuating member in either of two "on" positions, and means for automatically bringing the actuating member into an "off" position intermediate said two "on"

positions when the pressure of the fluid overcomes the resistance of the locking means.

6. A control valve for a fluid pressure control system comprising a chamber, a valve movable in the chamber to control the flow of fluid therethrough, an actuating member operating said valve, means for locking the actuating member in the "off" and "on" positions respectively, and means for automatically bringing the actuating member into "off" position when the pressure of the fluid overcomes the resistance of the locking means, said locking means comprising a cam surface on the actuating member having a central wide notch and a narrow notch arranged at each side of the central notch, and a spring loaded member cooperating with the said cam surface and engaged in the central notch in the normal position of the actuating member, or in any of said narrow notches in the respective "on" position of said actuating member, said cam surface being adapted under the action of the pressure fluid to ride upon the spring loaded member to disengage it from the respective narrow notch and thus unlock the actuating member from its "on" position and engage said spring loaded member into the wide notch and thus lock the actuating member in the "off" position.

7. A control valve having a pair of ports and a valve plunger cooperating with said ports to establish communication therebetween in normal ("off") position of the plunger, a third port through which fluid is directed when the plunger is set in one "on" position, a fourth port through which fluid is directed when the plunger is set in another "on" position, and means actuated by the pressure of the fluid admitted through said valve for automatically bringing the plunger and its actuating member to "off" position.

8. A control valve including a pair of ports and a plunger having a waist portion forming an annular chamber communicating in neutral position of the plunger with both said ports, a third port intermediate said pair of ports and having communication with the annular chamber formed by the said plunger in all positions thereof, including neutral and also including any of two "on" positions, each of which latter positions excludes one of said pair of ports from communication with said third port, means for locking said plunger in each "on" position, said locking means including a plunger actuating member having a detent engageable therewith, yielding means acting upon said detent, and means for returning the actuating member to the position corresponding to neutral position of the plunger as the fluid pressure overcomes the resistance of said yielding means.

EDWARD CLAUDE
SHAKESPEARE CLENCH.